US012732266B2

(12) United States Patent
Duyck et al.

(10) Patent No.: US 12,732,266 B2
(45) Date of Patent: Sep. 8, 2026

(54) COMMUNICATION SYSTEM

(71) Applicant: ST ENGINEERING IDIRECT (EUROPE) CY NV, Sint-Niklaas (BE)

(72) Inventors: Dieter Duyck, Sint-Niklaas (BE); Brecht Reynders, Mechelen (BE)

(73) Assignee: ST ENGINEERING IDIRECT (EUROPE) CY NV, Sint-Niklaas (BE)

( * ) Notice: Subject to any disclaimer, the term of this patent is extended or adjusted under 35 U.S.C. 154(b) by 253 days.

(21) Appl. No.: 18/710,512

(22) PCT Filed: Nov. 17, 2022

(86) PCT No.: PCT/EP2022/082249
§ 371 (c)(1),
(2) Date: May 15, 2024

(87) PCT Pub. No.: WO2023/089015
PCT Pub. Date: May 25, 2023

(65) Prior Publication Data

US 2025/0023634 A1 Jan. 16, 2025

(30) Foreign Application Priority Data

Nov. 22, 2021 (EP) .................................... 21209624

(51) Int. Cl.
*H04B 7/185* (2006.01)
*H04L 1/00* (2006.01)
(Continued)

(52) U.S. Cl.
CPC ....... *H04B 7/18582* (2013.01); *H04L 1/0004* (2013.01); *H04L 1/001* (2013.01);
(Continued)

(58) Field of Classification Search
CPC .. G01R 29/02; G01R 29/26; G01R 31/31708; H04B 7/18523; H04B 7/18582;
(Continued)

(56) References Cited

U.S. PATENT DOCUMENTS 5,936,972 A 8/1999 Meidan et al.
10,700,770 B2 6/2020 Mundra et al.

FOREIGN PATENT DOCUMENTS

CN 101521787 B * 9/2011
EP 2073400 B1 12/2011
(Continued)

OTHER PUBLICATIONS

Zhang et al., "transmission system with multiple modulation model and data frame filling method thereof," Machine English translation of CN-101521787-B, Clarivate Analytics, pp. 1-13. (Year: 2026).*
(Continued)

*Primary Examiner* — Thomas R Cairns
(74) *Attorney, Agent, or Firm* — Workman Nydegger

(57) ABSTRACT

A communication system includes a transmitter and one or more receivers. The transmitter is arranged to transmit a sequence of physical layer frames at a physical layer symbol rate. An adaptive coding and modulation optimization means are arranged to determine a first modulation and coding for transmitting per receiver of one or more receivers. The transmitter further inserts fill frames modulated (with a first fill modulation) prior to filtering with the transmit filter. The first fill modulation is selected from a set of fill modulations with at least one modulation with a modulation order higher than QPSK. The communication system includes link quality detection, which means to determine a metric of the communication link quality from a version of physical layer frames at the receive side. The
(Continued)

physical layer frames include the fill frames and convey the link quality metric to the adaptive optimization means.

17 Claims, 5 Drawing Sheets

(51) Int. Cl.
*H04L 1/20* (2006.01)
*H04W 28/10* (2009.01)

(52) U.S. Cl.
CPC ............... *H04L 1/20* (2013.01); *H04W 28/10* (2013.01); *H04B 7/18523* (2013.01); *H04L 2001/0093* (2013.01)

(58) Field of Classification Search
CPC ............ H04B 10/07953; H04B 17/309; H04H 40/90; H04L 1/0003; H04L 1/0004; H04L 1/0009; H04L 1/001; H04L 1/20; H04L 47/10; H04L 2001/0093; H04N 1/00103; H04N 7/20; H04W 28/10; H04W 72/12
See application file for complete search history.

(56) References Cited

FOREIGN PATENT DOCUMENTS

| | | |
|---|---|---|
| EP | 1862014 B1 | 6/2012 |
| WO | 2006099695 A1 | 9/2006 |
| WO | 2020065043 A1 | 4/2020 |

OTHER PUBLICATIONS

Extended European Search Report from corresponding EP Application No. 21209624.2, Apr. 29, 2022.
International Preliminary Report on Patentability from corresponding PCT Application No. PCT/EP2022/082249, Feb. 16, 2024.
International Search Report from corresponding PCT Application No. PCT/EP2022/082249, Feb. 10, 2023.
Vidal, O. et al. "Next Generation High Throughput Satellite System", 2012 IEEE First AESS European Conference on Satellite Telecommunications (ESTEL), Oct. 2-5, 2012, pp. 1-7.
Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X), ETSI Draft Specification; 302 307-2, European Telecommunications Standards Institute (ETSI), V1.3.2, Apr. 16, 2021, pp. 1-164.

* cited by examiner

COMMUNICATION SYSTEM

FIELD OF THE INVENTION

The present invention is generally related to the field of digital communication systems wherein techniques for automatically controlling the modulation and coding are applied. More in particular, the invention is concerned with methods to quickly determine the most efficient modulation and coding at which a transmitter can send a signal in a communication link.

BACKGROUND OF THE INVENTION

Two-way communication services in general are considered, where there is a link from a hub or gateway or base station (referred to as hub in the remainder of this description) to a terminal, called the forward (FWD) link, and a link from the terminal to the hub, called the return (RTN) link. In the case of multiple terminals per hub, this network is referred to as a star network, otherwise it is referred to as a point-to-point link.

A typical satellite two-way star network is illustrated in FIG. 1. A hub (101) communicates with a terminal (103) via at least one satellite (102). There are two main types of satellite: bent-pipe satellites and regenerative satellites. A bent-pipe or transparent satellite essentially operates as an amplifier forwarding the signal to increase coverage on earth. In such a system, multiple terminals may be covered through a single hub. A communication service may also contain several hubs each in connection with one or more terminals. In the case of a regenerative satellite the signal is demodulated on-board the satellite. The hub receiver is then replaced by the (multi-carrier) demodulator(s) on-board the satellite. In the forward link of such a star network, a hub typically transmits a single carrier which is received by all terminals. Alternatively, the hub transmits multiple smaller carriers, e.g. using OFDM as in 5G, each destined for a particular terminal. In the return link of such a star network where many terminal transmitters transmit to few hub receivers, the terminals share the communication link resources, meaning that the terminals must be organized to transmit orthogonal signals (i.e. signals not interfering in time or frequency or code). This is typically achieved by slaving all terminals to a common hub reference such as the network clock reference (NCR), which is a counter increasing at an internal clock rate synchronized with GPS time, cf. DVB-S2 Annex G.5. This slaving of all terminals to a counter from the hub is realized by including periodically the current NCR value in the forward transmission signal from the hub to the terminals.

In a star network, terminals in the same communication network can share the available return spectrum of that communication network in a multiple frequency time division multiple access (MF-TDMA) framework. Each terminal is assigned a portion of time and frequency spectrum for transmission, which can be visualized through a time-frequency diagram in the time-frequency plane. Alternatively, terminals can be assigned frequency slots in which they transmit all the time, referred to as an FDMA+SCPC (frequency division multiple access+single channel per carrier) return link. This is typically the case for high throughput terminals that always have high throughput requirements. Next to MF-TDMA and FDMA+SCPC, other multiple access techniques exist, such as CDMA, OFDMA (like in 4G or 5G), and many other.

In MF-TDMA the allocation of time and frequency slots, also referred to as resource allocation or scheduling, is performed in a central control unit. The central control unit is sometimes referred to as a controller or scheduler. The resource allocation is typically based on terminal capabilities (e.g. maximum power, maximum symbol rate), link quality (e.g. the signal-to-noise ratio (SNR) associated with the carrier from each of the terminals, interference, signal-to-amplifier distortion ratios etc), terminal capacity requests (e.g. the payload size it wants to transmit over the next scheduling interval, e.g. the next 40 ms, where payload refers to data bits), total link capacity (total bandwidth available), service level agreements (some terminals may get priority over other terminals based on the contract with the service provider) and fairness (especially for the same priority class terminals). Indeed, the controller is arranged to manage the capacity so that a fair distribution of the available capacity can be obtained in congested cases where not all capacity requests can be fulfilled. There are numerous algorithms to perform this resource allocation in an efficient and performant way, see e.g. "*Performance of fully variable demand assignment SS-TDMA system*" (Maral and Bousquet, October1987, Int'l Journal of Satellite Communications, pp. 279-290).

In order to have flexibility in assigning resources to a given terminal, terminals can be assigned to a different amount of time slots and frequency bins over time. The rules to assign time and frequency resources to terminals and the waveform definition mapped to this multiple access channel can be proprietary or standardized. One example of such a standard is Digital Video Broadcasting—Return Channel via Satellite (DVB-RCS and its second version, DVB-RCS2).

A 'burst' is a continuous-time carrier (hence, without guard time in between) from a particular terminal in the return link (from terminal to hub, potentially via a satellite). A burst contains known symbols (a preamble, pilot symbols) for synchronization and identification purposes, and data symbols or information symbols. In order to have an efficient transmission, i.e., with less guard time and less overhead (as there is only one preamble in a burst), longer bursts are of interest. A long burst can contain multiple forward error correcting (FEC) words, potentially thousands of FEC words.

In a return link the hub (in case of communication without satellite or with a transparent satellite) or on-board (in the case of regenerative satellites) multi-carrier demodulators demodulate and decode all carriers from all terminals in a communication network. The device (or devices) demodulating and decoding these carriers is (are) referred to as multi-carrier demodulator(s) (MCD).

The overall efficiency of the return link can be expressed as the number of useful bits transmitted over a frame divided by the product of the time duration of that frame (including the guard time) and the frequency bandwidth available for that communication network in the return link:

$$\text{efficiency} = \frac{\text{number of useful bits transmitted over a frame}}{\text{time duration of a frame} * \text{frequency bandwidth used}}$$

Alternatively, one could say the efficiency is the division of the number of useful bits over the area covered by the frame in the time-frequency plane. The number of useful bits transmitted over a frame is determined by the applied modulation and coding. In coding, useful bits are mapped to coded bits at a particular coding rate smaller than one. The more robust the coding, the lower this coding rate. In a modulation step these coded bits are mapped to complex I/Q symbols. The more robust the modulation, the less coded bits are mapped to I/Q symbols. There is a need to employ the most efficient (i.e., the least robust) modulation and coding over a link with a particular signal-to-noise ratio. Typically this is the most efficient modulation and coding that still corresponds to quasi error free transmission.

Obviously, in any forward link or return link technology there is a need to converge to the most efficient modulation and coding as fast as possible. This need is general, because it will provide the best user experience as fast as possible. Recently new use cases have emerged which make said fast convergence even more important. One example is found in satellite communications, where the popularity of communication through non-geostationary orbits is rapidly growing. With earth orbit constellations lower than geostationary earth orbit satellites, such as medium and low earth orbits (MEO and LEO), satellites are only in sight for a short period of time, after which transmission between a terminal and a hub or gateway must be handed over from one satellite (called the setting satellite) to another satellite (referred to as the rising satellite). Typically, a make before break handover is requested. In that case the link on the rising satellite is first "made" before the link on the setting satellite is "broken". As such, the link quality must be estimated on the rising satellite and a new modulation and coding must be determined before the traffic is switched from the setting to the rising satellite, hence, when there is no data available yet for transmission over the rising satellite. A user was previously serviced via the setting satellite and higher layers are counting on a particular rate that was delivered over that setting satellite. If suddenly, the physical layer delivers a lower rate when switching the traffic over the rising satellite, because the newly estimated modulation and coding is, due to too slow convergence, not yet the most efficient one possible over the rising satellite link, then packet loss will occur on queues (due to overflow) in the higher layers, which is undesired and suboptimal. Suboptimal in this context means that in case of a similar physical channel, the same physical layer throughput should be achievable there. Thus, for use cases such as MEO, where traffic must switch from a setting satellite to a rising satellite, there is a need to converge to the most efficient modulation and coding even before the first data packet is transmitted. As mentioned above, also other communication services of course benefit from such fast convergence.

In the state of the art of SCPC technology (i.e., a carrier with a fixed or very slowly varying symbol rate that is enabled for a very long time), when the data (e.g. baseband frames) provided to the modulator, do not fill the entire carrier, dummy frames are inserted to fill the carrier. An example is found in modulators implementing the DVB-S2 (X) standard insert dummy physical layer frames (PL-FRAMES), see FIG. 1 in ETSI EN 302 307 and Sec. 5.5.1 in ETSI EN 302 307. Dummy physical layer frames contain QPSK symbols and are not decoded by the receiver's decoder. In some important cases, e.g. over a non-linear channel, link quality estimation, based on reception of dummy frames, is poor, in the sense that the link quality is not representative for more efficient modulations and codings sent on the same channel. Clearly, in a handover from a setting satellite to a rising satellite, at the moment where data has not yet been switched from the setting to the rising satellite, only dummy physical layer frames are sent in the state-of-the art DVB-S2X transmitters, yielding poor link quality estimation and it is thus not possible to reliably or accurately converge to the most efficient modulation and coding in a fast way. Thus, there is a need for a more advanced modulator implementation to achieve a fast and accurate convergence to the most efficient modulation and coding even before the first data packet is transmitted, as the link quality estimation on dummy physical layer frames is not accurate enough.

The prior art does not teach how to achieve fast and accurate convergence to the most efficient modulation and coding. For example, DVB-S2X only advises on inserting dummy physical layer frames but that is not sufficient, for example in the case of combination with a demodulator using link quality estimation based on processing on the header or on decoder metrics.

Another problem in the prior art is that the link quality monitoring is not accurate, e.g. in presence of channel artefacts such as non-linear distortion, phase noise or interference. This problem cannot always be mitigated by more advanced receiver processing due to the requirement for low-cost terminals (e.g. in consumer broadband networks, or for low power applications such as modem cards that are embedded in antennas, or for on-board processing, requiring chip based modems with limited complexity). As a consequence, large ACM margins are adopted to avoid errors on the data transmission due to imprecise link quality monitoring, with repercussions on the efficiency of transmission. Hence, there is a need for a more intelligent solution to improve the link quality monitoring, allowing for lower ACM margins and so higher efficiency of transmission, even when using low-cost modems.

Hence, there is a need for a communication system wherein such a fast and accurate convergence of the modulation and coding is obtained.

SUMMARY OF THE INVENTION

It is an object of embodiments of the present invention to provide for a communication system with improved convergence speed of the adaptive coding and modulation.

The above objective is accomplished by the solution according to the present invention.

In a first aspect the invention relates to a communication system comprising

- a transmitter and one or more receivers, said transmitter being arranged to transmit over a communication link a sequence of physical layer frames, each comprising symbols, at a given physical layer symbol rate to said one or more receivers, said sequence of physical layer frames being filtered with a transmit filter,
- adaptive coding and modulation optimization means arranged to determine per receiver of said one or more receivers a first modulation and coding for transmitting data to the receiver in question, whereby the transmitter is arranged to map the data for the one or more receivers in frames using an operational modulation and coding based on said first modulation and coding, thereby obtaining encoded and modulated data frames and arranged to insert the encoded and modulated data frames into the sequence of physical layer frames, characterized in that the transmitter is further arranged to insert into the sequence, prior to said filtering with the transmit filter, at least one fill frame modulated with a first fill modulation or modulated and encoded with a first fill modulation and coding, said first fill modulation selected from a set of fill modulations comprising at least one fill modulation having a modulation order higher than QPSK or said first fill modulation and coding selected from a set of fill modulation and codings comprising at least one fill modulation and coding having a modulation order higher than QPSK. The communication system further comprises link quality detection means arranged to determine a metric of the quality of the communication link from a version of the physical layer frames of said sequence received in one or more of the receivers, said physical layer frames comprising said at least one fill frame, and to convey the communication link quality metric to the adaptive coding and modulation optimization means so that the first modulation and coding can be updated based on the quality metric.

The proposed solution indeed allows for achieving convergence of the adaptive coding and modulation in a quicker way. This is due to the addition of fill frames into the sequence of physical layer frames. The fill frame is modulated with a fill modulation or modulated and encoded with a fill modulation and coding that has a higher modulation order than QPSK. The fill modulation and coding can for example be taken to be 16-APSK 7/9. The use of fill frames is particularly advantageous to speed up convergence at start up, when there is no data or not enough data available yet.

In a preferred embodiment the transmitter is further arranged to insert at least one fill frame modulated with a second fill modulation from the set of fill modulations, said second fill modulation being different from the first fill modulation, or arranged to insert at least one fill frame modulated and encoded with a second fill modulation and coding from the set of fill modulation and codings, said second fill modulation and coding being different from the first fill modulation and coding.

In some embodiments the at least one fill frame is inserted into the sequence when there is not enough data available, resulting in a fill rate of the at least one fill frame. The fill rate of the at least one fill frame inserted into the sequence may advantageously be upper bounded by a configurable maximal fill rate. Preferably the fill rate is determined by the difference between the given physical layer symbol rate and the actual symbol rate of frames comprising said data for the one or more receivers.

In certain embodiments of the invention an applied fill frame is selected from the set of fill modulations or from the set of fill modulation and codings in a round-robin way.

In certain embodiments the communication system comprises encoding means to encode the fill frames before inserting into the sequence.

Advantageously, the set of fill modulation and codings comprises at least four fill modulation and codings.

Preferably the transmitter is further arranged for transmitting dummy frames.

In one embodiment the receivers are divided in subsets and to each subset of receivers is attributed a portion of the given physical layer symbol rate.

In a preferred embodiment the transmitter is arranged to add the at least one fill frame on a per subset basis.

In another embodiment the operational modulation and coding is at least as robust as the first modulation and coding.

In some embodiments the given physical layer symbol rate is assigned to the transmitter as a part of an overall physical layer symbol rate distributed over a plurality of transmitters. The system with the plurality of transmitter devices then gets assigned the overall physical layer symbol rate, which is next distributed over the various transmitters.

In a preferred embodiment the metric of the quality of the communication link is a decoder assisted link quality metric.

In some embodiments the metric of the quality of the communication link is determined based on previously received physical layer frames. Alternatively, the metric may be determined based on a subset of previously received physical layer frames, said subset dependent on one or more predefined conditions, such as, for example, temporal conditions or channel state conditions as an SNR.

In an advantageous embodiment the at least one fill frame is inserted before the data is mapped into the encoded and modulated data frames. In a further embodiment the at least one fill frame is inserted after encapsulation.

In another aspect of the invention fill frames are advantageously used to enhance the system performance. The invention then discloses a communication system comprising

- a transmitter and one or more receivers, said transmitter being arranged to transmit over a communication link a sequence of physical layer frames, each comprising symbols, at a given physical layer symbol rate to said one or more receivers, said sequence of physical layer frames being filtered with a transmit filter,
- adaptive coding and modulation optimization means arranged to determine per receiver of said one or more receivers a first modulation and coding for transmitting data to the receiver in question, whereby said transmitter is arranged to map said data for said one or more receivers in frames using an operational modulation and coding based on said first modulation and coding, thereby obtaining encoded and modulated data frames, and arranged to insert said encoded and modulated data frames into said sequence of physical layer frames.

The communication system is characterized in that the transmitter is further arranged to insert into the sequence, prior to the filtering with the transmit filter, at least one fill frame modulated with a first fill modulation or modulated and encoded with a first fill modulation and coding, said first fill modulation selected from a set of fill modulations comprising at least one fill modulation with a modulation order higher than QPSK or the first fill modulation and coding selected from a set of fill modulations and codings comprising at least one fill modulation and coding with a modulation order higher than QPSK, and in that the transmitter is arranged to adapt the given physical layer symbol rate based on the amount of inserted fill frames.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
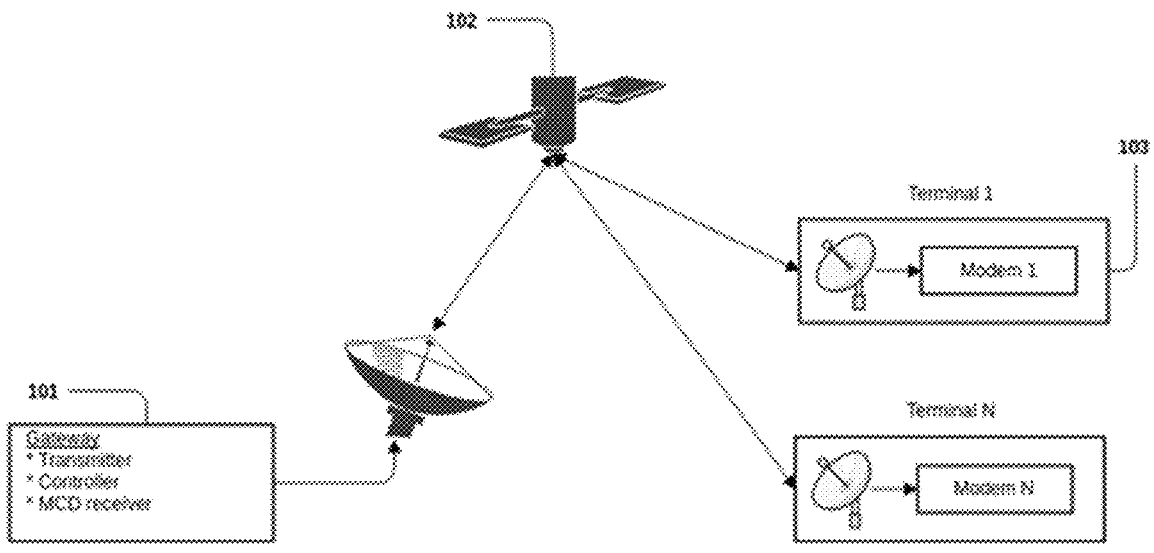
FIG. 1 illustrates a typical satellite star network.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Some definitions of terms employed in this description are first given.

A hub is a gateway between the access network of terminals, for example a satellite or wireless access network, and the core network (also known as the Internet). The hub side of the access network is typically more expensive with better equipment, such as more expensive power amplifiers having sufficient power to be operative in the linear region (resulting in less non-linear distortion) and better link quality with the satellite.

A terminal is the remote end of the satellite or wireless access network that typically aggregates a small amount of user equipment, e.g. computers and smart phones.

A communication link is to be construed as a wireless link with a feedback channel. Typically both the wireless link and the feedback channel are wireless. In one embodiment the links are "over satellite", meaning that the satellite is part of the link between transmitter and receiver. In other embodiments the wireless link is a terrestrial link whereby a hub directly communicates with one or more terminals without a satellite in between. A digital communication system is considered comprising at least one transmitter and at least one receiver.

The term 'communication network' refers to all components combined, being hub(s), terminal(s), communication link(s) and computers with the Internet. In some embodiments the communication network is a star network, whereas in other embodiments point-to-point connections are encountered.

In a digital communication system as considered in this invention, one can, at the transmit side, distinguish the processes of encoding and modulation, as is often the case in such systems. The information bits are first translated to a sequence of digital symbols (encoding) and subsequently the digital symbol sequence is translated to a continuous transmit waveform (modulation). The transmit waveform usually has a band-pass spectrum. It can then still be represented by an equivalent complex baseband transmit waveform having only low frequency components. The radio frequency waveform is obtained from the complex baseband waveform by quadrature modulation and possibly further frequency upconversion. Before transmission over the air, the carrier waveform is amplified by a transmitter high power amplifier (HPA) to reach a configured or desired transmit power. Sometimes upconversion and amplification are combined in a single operation, e.g. by using frequency multiplier upconverters. The combination of up-conversion and amplification is generally denoted block-up conversion (BUC).

In so-called linear modulation schemes, the complex waveform, e.g. baseband waveform, is obtained as the superposition of pulses of essentially finite duration, each pulse being the product of a complex-valued symbol with a delayed instance of a pulse known as the transmit filter impulse response. The finite set of complex-valued symbols is known as the constellation. A constellation is commonly represented as a set of M dots in a plane by interpreting the real and imaginary part of each of M symbol value as abscissa and ordinate with respect to orthonormal axes. M is typically denoted as the modulation order. In a Phase Shift Keying (PSK) constellation all dots are located on a circle in the I-Q plane. In an amplitude and phase shift keying (APSK) constellation this restriction to a single circle is lifted. In this description the older term Quadrature Amplitude Modulation (QAM) is not used, as some authors use it as a synonym for APSK, whereas others denote with the term a special form of APSK wherein the dots are arranged in a dense rectangular or hexagonal grid.

Digital communication systems often use binary encoding. In that case the encoder in general does not directly map the information bits to symbols. Rather it maps the information bits to coded bits. Subsequently a group of code bits is used to designate a transmit symbol. The latter operation is commonly called bit mapping and the group of log 2M code bits designating a transmit symbol from an M-ary constellation is called a bit label. This process is usually mirrored at the receive side by bit demapping, followed by binary decoding, as explained below. An interleaver may further reorder code bits prior to mapping in order to improve overall system performance. As a person skilled in the art of digital communications readily understands, the encoder, interleaver and mapper may at different times employ different code rules, interleaving rules and constellations. The combination of a particular modulation (employing a constellation on which the coded bits are mapped) and coding (referring to the binary encoding) is denoted a modcod.

Summarizing, an input data frame, in general denoted an information frame, e.g. a baseband frame, is in the modulation and coding means encoded to a forward error corrected (FEC) frame (called coding), mapped to a physical layer frame of symbols (called modulation) and pulse shaped in a pulse shaping filter (which is often also referred to as the transmit filter) to a waveform, e.g. a baseband waveform. Hence, each information frame is associated to a modulation and coding (modcod). In DVB-S2(X) the number of coded bits of "normal" frames equals 64800 bits. Thus, the number of bits in an information frame, before encoding, has a length depending on the encoding rate, e.g. 2/3. Also, the number of symbols in an encoded mapped information frame depends on the number of bits mapped to a single symbol (e.g., 2 bits for QPSK, 3 bits for 8-PSK, 4 bits for 16-APSK constellations, etc.).

The used modcod may be varied, a technique commonly known as adaptive coding and modulation (ACM). See ETSI EN 302 307 v1.2.1*: Second generation framing structure, channel coding and modulation systems for Broadcasting, Interactive Services, News Gathering and other broadband satellite applications*. The present invention is applicable to any digital communication system or scheme using ACM to transmit information all the time or only a fraction of the time. A person skilled in the art of digital communications readily understands that in addition a priori known symbols or partially a priori known symbols may be inserted for the purpose of assisting receiver synchronisation. When a priori known symbols are inserted before the symbols mapped from the coded bits, those a priori known symbols are referred to as a preamble. When a priori known symbols are inserted in between the symbols mapped from the coded bits, those a priori known symbols are referred to as pilot symbols.

In the forward link one or more terminals at the receiver side receive the transmitted waveform. The waveform is demodulated to obtain the receive values of the various symbols. The receive value of a symbol is not exactly equal to the transmit value, due to channel effects such as the addition of noise and distortion. The symbols are subsequently demapped. The demapper outputs for example likelihood ratios of the coded bits, which are next fed to the decoder. Like the encoder, the decoder can be composed of one or more concatenated decoders. In some embodiments one or more decoders can process the received information in an iterative manner and one or more decoders can also exchange information with the demapper in an iterative fashion. Both the demapper and the decoder may provide information regarding the quality of the received signal and thus of the quality of the communication link. In an embodiment this link quality metric is the signal-to-noise-and-distortion ratio measured with a state-of-the-art noise and distortion level estimator and here referred to as CND (where C denotes the carrier power or useful signal power, N thermal noise power and D distortion power). CND refers to the ratio of the average signal power vs the power of all impairments seen by the decoder. There are many link quality estimation algorithms available. These algorithms can be divided in two classes: algorithms using a priori knowledge of the transmitted symbols (so-called pilot symbols), also known as data-aided (DA) algorithms, and algorithms which do not use pilot symbols, also known as non-data-aided (NDA) algorithms. Amongst the NDA algorithms, an algorithm is further a decision-directed (DD) algorithm if it uses a detection or a decoding scheme in order to deliver a provisional (or tentative) symbol value that is used as a priori information.

A metric of the communication link quality is calculated on the signal coming in at a receiver. The processing of the received signal to obtain the link quality metric can in some embodiments be performed in the terminal itself, but it can also be done outside the terminal. In one embodiment the link quality information can for example be extracted using machine learning tools external to the receiver, such as neural networks in the cloud. Obviously, the location of processing is not critical and does not limit the invention. The link quality estimation made at a particular receiver may be used by an adaptive coding and modulation (ACM) unit to influence the selection of the current modcod used by the transmitter to map information frames to physical layer frames destined to that particular receiver, to increase the availability or the throughput of the communications link.

Summarizing, ACM is a process that uses an estimated communication link quality metric at the receiver to maintain availability (i.e., use a more robust modcod in case of decreasing link quality) or increase the throughput (i.e., use a less robust but more efficient modcod). The link quality variation can for example be caused by fading.

In general, the link quality estimation is input to an adaptive coding and modulation optimization function. In case of a forward link this adaptive coding and modulation optimization function can reside fully at the hub side, or can be spread over the hub side and the terminal side, or can be fully located at the terminal side. Similarly, for the return link, the optimization function can be located across the network. Typically, however, it remains on the hub side. The adaptive coding and modulation optimization function returns based on the estimated link quality an advised modulation and coding, i.e. in some embodiments the most efficient modulation and coding given the estimated communication link quality. In other embodiments the advised modulation and coding is the most efficient modulation and coding, within a selected subset of modcods (e.g. modcods designed for a non-linear channel), given the estimated communication link quality. The selected subset of modcods can for example be determined by the network operator and signalled to the terminals. Alternatively, the selection can be determined on the terminal itself, either via configuration, either via a learning method (e.g. machine learning).

The adaptive coding and modulation optimization function is aware of the quasi-error free (QEF) decoding thresholds of all modulations and codings that are possibly used in the transmission. A quasi error free decoding threshold refers to the SNR values at which the frame error ratio is sufficiently small, e.g. 1e−7 or 1e−5. Given the communication link quality estimation, it can advise an advised modulation and coding that can be decoded quasi error free. Note that for terrestrial communications modulations and codings are chosen such that the frame error rate at a particular SNR is around 0.1, which is for example the case in 4G or 5G. Due to the short latency, retransmissions in the case of a decoding error do not cause bad user experiences and even provide an increased diversity (resulting in a faster decrease of the frame error rate with respect to increasing SNR). Hence, automatic repeat request (ARQ) or hybrid ARQ (HARQ) can be applied. In GEO satellite communications, however, the latency is too large for retransmissions and retransmissions do not provide increased diversity either. Therefore, in satellite communications the most efficient modulation and coding resulting in quasi error free transmission (e.g. a frame error rate smaller than 1e−7) is chosen. The invention is not limited to when a particular modulation and coding is chosen. Any mapping between the link quality estimation and an advised modulation and coding that satisfies the use case requirements, is acceptable.

There are different types of terminals, e.g. terminals with small Field Programmable Gate Arrays (FPGAs) and worse quality of decoders, terminals with large FPGAs and high quality decoders, or terminals with chip based receivers. In some embodiments the terminal itself keeps track of its decoding thresholds per modcod and maps an estimated link quality on an advised modcod. Alternatively, the hub may keep track of the terminal types and the mapping of the estimated link quality to an advised modcod can occur at the hub side. This may also be the case when there is only one terminal type. In case the terminal maps the estimated link quality to an advised modulation and coding, the hub may be able to update or overwrite the modulation and coding, e.g. to align with a network operator list of modcods to which the transmission must be limited. The invention is not limited to any of those options.

As already mentioned, a typical realization of data communication over a two-way network is based on a star network comprising a hub and a plurality of terminals (see also FIG. 1). A hub may contain several transmitters and/or receivers, e.g. if the bandwidth needed in the forward link is larger than the bandwidth that can be transmitted from a single transmitter. The receive terminals to which traffic can potentially be combined in a single frame, are grouped in a network. These terminals decode a same carrier at the same time. In some embodiments of a communication system according to this invention, there is at least one such network of terminals. In other embodiments there is only one terminal (point-to-point link). A network processor (e.g. a central processing unit (CPU) processor on a blade server) is responsible for handling forward and return (also referred to as inbound and outbound) traffic associated to a network. A blade server is a stripped-down server computer with a modular design optimized to minimize the use of physical space and energy.

Figure 2:
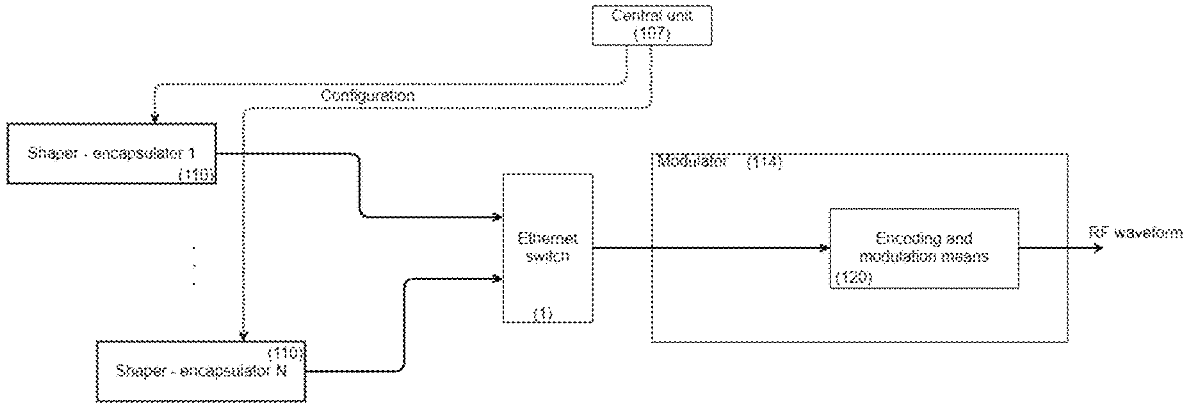
FIG. 2 illustrates a general block scheme of a communication system as considered in the present invention.

In embodiments of the present invention a communication system is considered wherein in the forward link a network processor (e.g. a processor on a blade server) multiplexes data (also referred to as traffic) to the group of terminals of one of the networks in an information frame which is then sent via a carrier to the modulator (e.g. over an Ethernet cable or over a coaxial cable). Such an information frame is for example a baseband frame but it can also be another type of frame. Each group of terminals (each network) has its carrier in these embodiments. The two essential components of the network processor are referred to as a shaper and an encapsulator. The average speed or rate at which such frames are sent to the modulator, depends on the average rate at which I/Q symbols for this network are transmitted over the air (typically equal to a symbol rate of a transmitted carrier or a fraction thereof in case of time slicing, see DVB-S2 Annex M). FIG. 2 provides an illustrative block scheme. The shaper-encapsulators (110) are controlled by a central unit (107). The encapsulated data are in this example via an Ethernet switch (1) forwarded to the modulator (114), which comprises encoding and modulation means (120).

In the transmitter part of some embodiments of the satellite communication system of this invention a shaper shapes a physical carrier symbol rate and the encapsulator encapsulates data into frames in basically the same way as in the prior art solutions, i.e., information frames (in the form of a sequence of bits) are sent to the modulator such that the modulator can encode and modulate said information frames to yield data physical layer frames containing complex-valued I/Q symbols. To fill the physical carrier the data physical layer frames are interleaved with dummy frames (e.g. dummy PLFRAMES in DVB-S2X) resulting in a stream of complex valued I/Q symbols transmitted at a rate equal to the physical carrier symbol rate. Thus, one physical carrier is used for data traffic of exactly one network. The traffic from multiple users in that one network is multiplexed in a same carrier, whereby the multiplexing takes into account one or more of jitter requirements, traffic priority classes, the adoption of a beam hopping or non-beam hopping satellite, based on link budgets and on the symbol rate and the link budget per user. This complex process takes place in the network processor. The process is referred to as shaping-encapsulation, as discussed e.g. in WO2006/099695. The modulator then encodes and modulates the information frames (e.g. baseband frames) into data physical layer frames consisting of complex-valued I/Q symbols (at a rate equal to the physical carrier symbol rate) and finally an RF signal (typically with a 3 dB bandwidth equal to the physical carrier symbol rate when using Nyquist signalling).

Time slicing was standardized in ETSI EN 302 307: "Digital Video Broadcasting (DVB); Second generation framing structure, channel coding and modulation systems for Broadcasting, Interactive Services, News Gathering and other broadband satellite applications", annex M) and also in ETSI EN 302 307-2 V1.1.1 (2014-10): "*Digital Video Broadcasting* (*DVB*); *Second generation framing structure, channel coding and modulation systems for Broadcasting, Interactive Services, News Gathering and other broadband satellite applications; Part 2: DVB-S2 Extensions* (*DVB-S2X*)", here-after referred to as DVB-S2X. Receiver terminals in the communication system are divided into subsets, each subset referred to as a satellite network (satnet), and multiple satnets are served by the same physical carrier. More specifically, each of these satnets gets a portion of the physical carrier symbol rate. Each portion then corresponds to a symbol rate of a so called virtual carrier. A virtual carrier refers to the collection of time slices assigned to the corresponding satnet. For example, in case three equally large virtual carriers are sharing the same physical carrier, the virtual carrier symbol rate is upper bounded by one third of the physical carrier symbol rate. A receiver knows which physical layer frame to demodulate and decode to retrieve the information frame by first decoding the time slice number encoded in the header of each physical layer frame. In the sharing mechanism implemented by time slicing, receivers then only decode frames which have a frame tag or slice number comprised in the set of the time slice numbers associated to the group of receivers they belong to. Otherwise the frame is discarded. Independent satnet processing before the modulation is performed per virtual carrier. E.g., two time slice numbers can be assigned to a satnet, such that the virtual carrier is a collection of the frames corresponding to those two time slice numbers. A time slice number can only be assigned to a single satnet, thus to a single virtual carrier. Hence, given a particular time slice number it is immediately known which satnet is considered. The virtual carriers each relate to a disjunct set of N time slice numbers. The number N of time slice numbers per virtual carrier is not necessarily the same for each virtual carrier.

The need for time slicing has come through the introduction of very wideband transmissions over high throughput satellites. Very high throughput satellites (HTS), where single transponders have large bandwidths (in the order of 500 MHz), have significantly reduced the cost per Mbit for satellite communications and are therefore omnipresent in applications like broadband communication, mobile communication and enterprise connectivity (see O. Vidal et al., "Next generation high throughput satellite system," IEEE AESS Eur. Conf. on Sat. Telecom. (ESTEL), 2012). The data demand in a satellite network is typically greatest in the forward link from gateway over satellite to terminal, as users have higher download demands than upload demands. Thus, the number of subscribers is limited due to the available bandwidth in the forward link. Hence, the achievable bandwidth of the forward link carrier is a differentiator. This bandwidth has increased dramatically with the introduction of HTS. A consequence, however, is that all receivers in the satellite network must be able to process the huge bandwidth. Typically, the throughput of the coded bits is limited due to decoder throughput limitations at the receiver. Also, the clock speed at which buffers are read is limited at receivers. Time slicing, as explained in ETSI EN 302 307, has been proposed in EP2073400 B1. When performing time slicing, all receiver terminals are subdivided in groups which each only decode a subset of the physical layer frames, said subset of physical layer frames identified through an associated frame tag or slice number. ETSI EN 302 307 explains which encoder to use to encode the time slice number in the physical layer header (the first 180 complex-valued symbols of a physical layer frame, in the case of ETSI EN 302 307). This allows a receiver to only decode the physical layer header to decide whether it is required to further decode the entire frame or not, as already explained before.

The shaping-encapsulating of information frames to fill a physical carrier can be extended to cover cases where time slicing is applied, as described in detail in WO2020/065043A1. The concept of virtual carriers as explained above of course only works in the presence of specific bounds on the virtual carrier symbol rates in order to avoid packet loss. The specific bounds, as well as the association of time slice numbers with groups of receivers, are applied by a controller (i.e. a central unit 107) which is steering the shaper-encapsulators (110) that perform the shaping and encapsulation (see also FIG. 2). Whether the symbol rate shaped to is a virtual carrier symbol rate or a physical carrier symbol rate makes no difference for the shaper-encapsulator. Whether time slicing is used or not makes no difference. Frames from the multiple shaper-encapsulators need to be multiplexed. Indeed, for e.g. three virtual carriers in a physical carrier, three shaper-encapsulators burst information frames to a single modulator (114). For layers above the physical layer, it is as if the transmission occurs over multiple carriers. In other words, whether data is transmitted over multiple carriers or a single carrier is no more than a physical layer implementation detail. In upper layers the further processing is modular and performed on satnet per satnet basis.

More specifically, the satnet processors in the transmitter, which comprise the shaping and encapsulating means, are configurable. For example, a service provider can statically configure its network, e.g. by configuring the virtual carrier symbol rates for each satnet. The central unit can dynamically change the virtual carrier symbol rates within a physical carrier taking into account congestion, jitter and other important constraints in the network. To avoid buffer overflow, it is important to first lower the symbol rate of the virtual carriers that get smaller, after which the symbol rate of the virtual carriers that get bigger can be increased.

Figure 3:
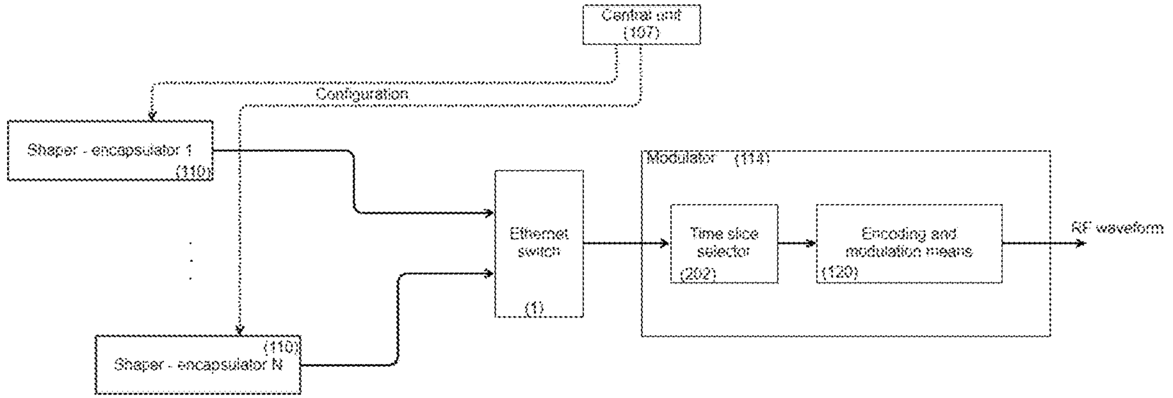
FIG. 3 illustrates a scheme with a modulator comprising a time slice selector.

The shaping and encapsulation means (110), which perform shaping and encapsulation and each correspond to a virtual carrier, send UDP or other type of packets to an Ethernet switch (1). Each packet contains one or more full frames. The switch multiplexes the incoming packets on one output bit stream to the modulator. As a frame, e.g. a baseband frame, is not spread over multiple packets, the output bit stream to the modulator contains a sequence of full frames such that no reassembling on the modulator is needed. This saves resources and implementation time. In the modulator (114) a time slice selector (202) stores the frames in storage means, e.g. in a RAM. FIG. 3 depicts the time slice selector in the modulator block. Other ways to bring frames to the modulator may be by allowing frames to be cut in pieces requiring for a reassembling of frames on the modulator first or by receiving frames from the means for shaping-encapsulating over another interface than an Ethernet cable, such as a coaxial cable, subsequently storing the frames of all virtual carriers in the storage means.

Figure 4:
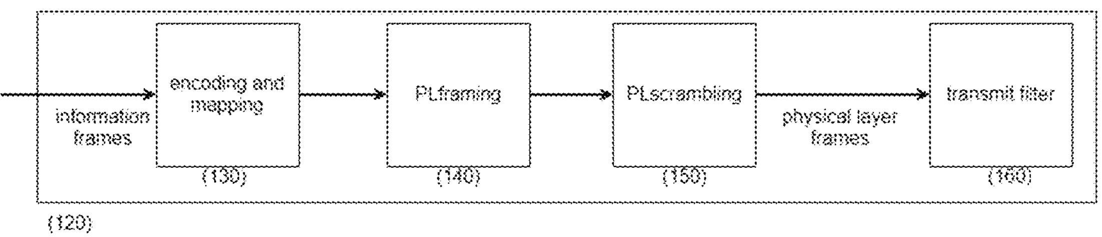
FIG. 4 illustrates a possible implementation of the encoding and modulation means in the modulator.

A typical implementation of the encoding and modulation block (120) in FIG. 3 is shown in FIG. 4, more specifically for DVB-S2X. Information frames are fed to an encoding and mapping block (130). A physical layer framer (140) takes care of putting the encoded and mapped data into frames, e.g. in the case of DVB-S2X including a physical layer header and pilots. The physical layer scrambler (150) scrambles the frames, amongst other in order to increase the data integrity and outputs physical layer frames to the transmit filter (160).

Figure 5:
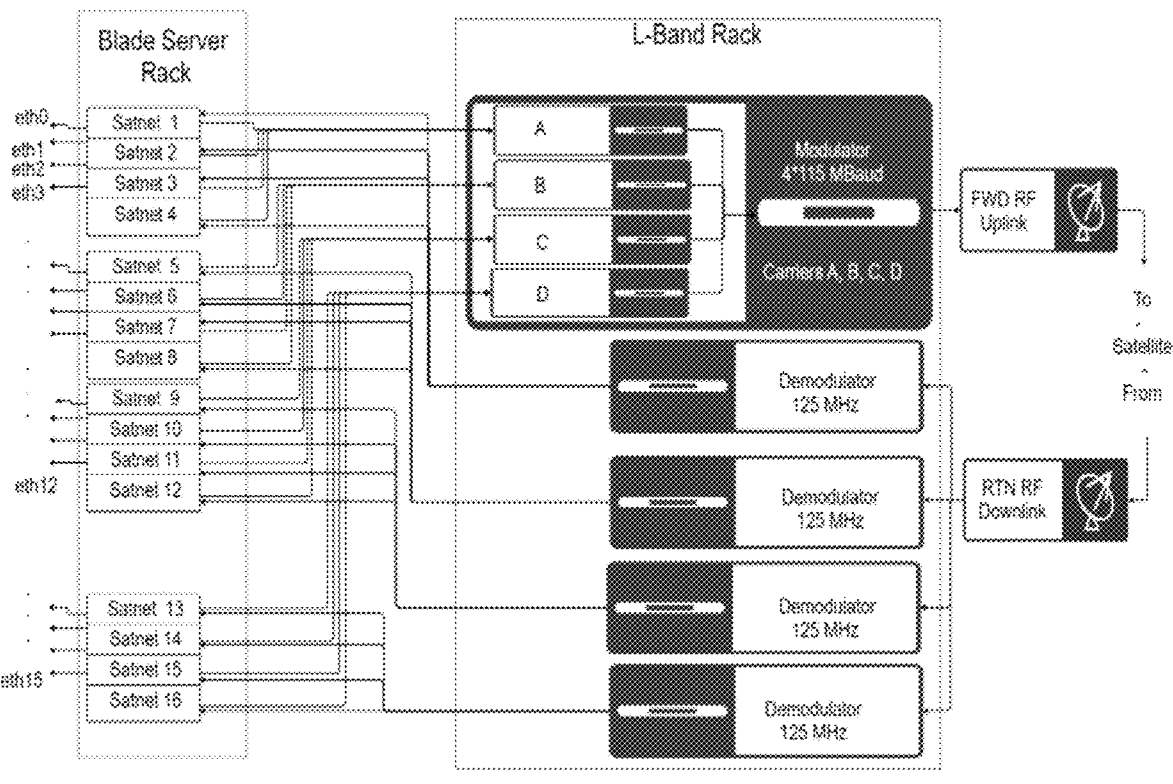
FIG. 5 illustrates an example of network processing for a satellite network with a plurality of satnets.

An example of the use of time slicing to multiplex frames from multiple nets and thus different network processors per physical carrier is given in FIG. 5 for a satellite network, where networks are denoted satnets. In the illustrated example there are 4 satnets per physical carrier and 4 physical carriers per modulator. FIG. 5 also illustrates the return link, via which a link quality estimation (or the advised modcod if mapped by the terminal based on the link quality estimation) is fed back to the satnet processor. Waveguides (e.g. coaxial cables for L-band interfaces) connect the RF equipment to the (de)modulators in the rack. The inputs of the physical carrier modulator functions are connected to the blade servers which handle encapsulation and traffic shaping before transmitting over, for example, Ethernet interfaces. The concept of a satnet is also shown, i.e. a set of terminals and their associated traffic, which belong to one carrier (a virtual carrier, in case of timeslicing). One or more satnets are multiplexed per physical carrier. In turn, each satnet is connected to the incoming traffic from the network at the terminal side via an Ethernet interface.

The conversion of data bits to information frames (e.g. baseband frames) comprising bits destined for one or more terminals in the same network is performed by a shaper encapsulator (110). In a shaping process an estimate of the total available bit rate that can be transmitted is divided over the users requesting traffic, in a "fair" way (taking into account jitter, the contract between the provider and the customer, the hopping plan in case beam hopping is applied, etc). In the encapsulation process these bits are then inserted in information frames with the purpose of providing valid input frames for forward error correction encoding. Typically, the advised modcods are sorted according to their associated spectral efficiency. The information frame length corresponding to a given modcod is fixed. When there are not enough bits to fill an information frame corresponding to a low modcod (i.e. with a low spectral efficiency), bits corresponding to an advised modcod with higher spectral efficiency are inserted in the information frame corresponding to the lower modcod, in order to avoid a need to use padding, e.g. zero padding, in that frame (which would be a waste of efficiency). This is acceptable as a user able to decode this higher modcod (i.e. with higher spectral efficiency), for sure can also decode the lower modcod. However, that user then occupies more bandwidth than estimated at first (as a part of its bits are transmitted via a modcod with lower spectral efficiency). Hence, in the next shaping round a bit less capacity is foreseen such that on average, the carrier symbol rate throughput is respected and buffers in the FPGA are not overflowing. Each information frame is finally encapsulated with the corresponding header indicating the modcod (and thus the encoding rate and the modulation) to be used for that frame (and its associated information frame length). More information on shaping can for example be found in EP 1 862 014 B1.

For example in scenarios as sketched above, where bits corresponding to different modcods are inserted in an information frame, the operational modulation and coding used to encode and modulate bits for a terminal is obviously not always the same as the advised modulation and coding computed based on the link quality estimation for that terminal. Hence, in general the operational modulation and coding does not necessarily have to be the same as the advised modulation and coding. More specifically, when there are not enough bits to fill an information frame corresponding to a modcod with lower spectral efficiency, bits corresponding to a modcod with higher spectral efficiency are inserted in the information frame corresponding to that modcod with lower spectral efficiency, in order to avoid padding, e.g. zero padding, in the frame. In addition to (typically unicast) data sent to terminals, sometimes multicast data or signalling (or control) information is to be sent to multiple terminals. This must obviously occur using a modcod that can be decoded in a quasi error free manner for all terminals to which that multicast data or signalling is destined. Sometimes, the "lowest" modcod of all used modcods is used for such multicast data or signalling. In other cases, this modcod is more optimized, see for example U.S. Ser. No. 10/700,770 for more information. However, in most cases a QPSK modulation is used to transmit multicast data or signalling.

In the state of the art of SCPC transmission, when the data in the information frames (e.g. baseband frames) provided to the modulator, e.g. from the one or more shaper encapsulators, do not fill the entire virtual or physical carrier, dummy frames are inserted to fill the carrier. As already mentioned previously, e.g. modulators implementing the DVB-S2(X) standard insert dummy frames referred to as dummy PLFRAMES in ETSI EN 302 307. The dummy frames make sure that at each symbol time the transmit filter (referred to as BB filter in ETSI EN 302 307) has access to valid I/Q symbols in order to have a clean and stable spectrum and a constant RF signal power. In other words, when the FEC encoder does not yet finish the encoding of an information frame to a FEC frame (see ETSI EN 302 307), e.g. because there is not sufficient data to transmit, the Physical Layer Framer inserts a valid dummy frame such that the spectrum remains clean and the output power constant. As such, all receivers also remain in lock at the receiver side. Dummy frames contain QPSK symbols and are not decoded by the receiver's decoder.

In some important use cases, e.g. over a non-linear channel, link quality estimation based on dummy frames is poor, because the efficiency from the adopted modulation and coding may be too far from the efficiency that would be possible for the given link quality. If e.g. QPSK symbols (as used in dummy frames) are chosen for a link where 32-APSK symbols could be transmitted and if the decoder only requires a few decoding iterations and the link quality estimation is based on decoder metrics, then the link quality estimation is typically poor. The link quality is then not representative for higher modulations and codings sent on the same channel. For example, the CND observed by the decoder in the case of transmitting 32-APSK symbols can be 1 dB lower than the SNR that would be estimated by a state of the art link quality estimator on the QPSK symbols in dummy frames. This is because the peak-to-average power ratio of QPSK transmission is 1 to 2 dB lower than for 32-APSK transmission, resulting in a different output power level at the output the on-board power amplifier, and another distortion power as well. Note that in case the shaper encapsulators do not send any data, only dummy frames are sent on the link.

The present invention proposes a communication system, wherein at least one transmitter is arranged to insert, apart from the data frames, fill frames in the sequence of physical layer frames with a first fill modulation and coding. Fill frames are inserted when a terminal tries to connect or in other events such as fades or periodically or as a partial replacement of dummy frames. In some embodiments the first fill modulation and coding is chosen depending on a link SNR estimate, such that it is representative of the estimated SNR, meaning that the quasi error free (QEF) decoding threshold of such modulation and coding is only a little bit below that SNR, e.g. within a margin of 2 dB, which can help the receiver to perform a more reliable link quality estimation on the received version of the fill frame. In another embodiment, a fill modulation and coding is chosen with a QEF decoding threshold a little above that SNR, e.g. to verify whether that modulation and coding can be received reliably. In other embodiments the first fill modulation and coding can be fixed to a particular modulation and coding. This simplifies the insertion of fill frames as it is not needed to look at the link SNR to determine the first fill modulation and coding. In that case, also inserting fill frames in the sequence of physical layer frames with a second fill modulation and coding is of interest, however, as will be explained later.

In a preferred embodiment, the purpose of the fill frames is to quickly estimate the current link conditions. Therefore, the fill frames are sent in one embodiment on events where the link conditions between transmitter and receiver change drastically, such as when making a new connection (e.g. over a new satellite upon a satellite handover, or via a new base tower in terrestrial communications) or upon experiencing a fade. Alternatively, some embodiments use periodic transmissions of fill frames such that at least one fill frame of a certain modulation or modulation and coding is received at a fixed time interval such as the time interval at which the ACM algorithm queries the demodulator statistics. In a preferred embodiment the update rate of the demodulator statistics in the ACM algorithm is 4 Hz to adapt to fading conditions such that it is preferred to receive a certain fill modulation and coding at least 4 times per second. In a preferred embodiment fill frames are only inserted when no data frames are available to be transmitted such that the bandwidth available for data transmission is not reduced by the insertion of fill frames. For example, when making a new connection in a make before break fashion, a new connection is made before the old connection is broken. Hence, data frames are first still transmitted on the old connection when the new connection is made. Hence, fill frames can be inserted on the new connection as there are no data frames available on that new connection.

The use of fill frames is beneficial for estimating the link quality. As already mentioned above, the link quality estimation based on dummy frames may be poor in certain circumstances. The fill frames allow for a more reliable estimation of the link quality. The fill frames also allow for a quick estimation of the link conditions. The drawback that dummy frames are bound to use QPSK symbols is avoided, as fill frames have at least a first fill modulation and coding with a modulation order adapted to the current link conditions. This allows for an adequate estimation of the carrier power and distortion power and thus a good approximation of the CND.

In some embodiments the link quality estimation can be based on the already received symbols, i.e. symbols in frames in the sequence received so far, possibly in all frames already received. As already mentioned, however, in some cases the estimated link quality may be poor, because the efficiency from the adopted modulation and coding may be too far from the efficiency that would be possible for the actual operational link quality. Therefore, it can be advantageous to base the link quality estimations on received physical layer frames with a decoding threshold not too far from the operational link quality. For example, when using as a decoding metric the number of bits corrected by the decoder, mapping this metric to the link quality works well up to an SNR that is 2 dB above the decoding threshold, but not further. It is well known in the art that, when the SNR is significantly above the QEF threshold, no bits or very few bits are corrected and it is impossible to estimate the SNR of that specific frame based on mapping the corrected number of bits to an SNR. Indeed, when transmitting for example a QPSK modcod (in which case two bits are mapped to four possible I/Q symbols, one in each quadrant of the I/Q plane) over a link with an SNR of 15 dB, the received symbols form isolated clouds in each of the quadrants. Hence, decoding is not needed anymore and the received symbols can be mapped immediately to bits without decoding. Another example of how to estimate channel quality can be found for example in U.S. Pat. No. 5,936,972 A, which uses the syndrome, after making a hard decision on the received symbols, to estimate the signal quality. The syndrome is non-zero when an error is made while making said hard decision. In U.S. Pat. No. 5,936,972 A it is explained that a non-zero syndrome vector can be used as an estimator of the bit error rate which in turn can be mapped on the signal to noise ratio for example.

In order to be able to deal with such situations, it may be desirable to insert fill frames associated to more than one fill modulation or fill modulation and coding. In some embodiments at least one fill frame can be inserted with a second fill modulation or fill modulation and coding different from the first fill modulation or fill modulation and coding. In other embodiments a set of possible fill modulations or fill modulations and codings is available from which a modulation and coding is selected. For example, one can have a set of 4, 5, 6 or 7 modulation and codings to choose from, with decoding thresholds spread over the region from 0 to 18 dB. The thresholds can be evenly spread or not. In the case of even spreading, seven modcods with a decoding thresholds roughly at 0, 3, 6, 9, 12, 15 and 18 dB can be chosen for example. Another example with four fill modulations and codings can take a set of four modcods with decoding thresholds roughly at 8, 11, 14 and 17 dB. In some embodiments the fill rate of fill frames associated with the modulation(s) or modulation and coding(s) selected from said set is configurable.

In some embodiments the fill frames may be associated in a round robin way to the e.g. 4, 5, 6 or 7 modulations or modulation and codings comprised in the set. By doing so any receiver in the coverage sees from time to time at least one physical layer frame with a modulation or modulation and coding that has a decoding threshold less than 3 dB from its operational link SNR, provided that the link SNR is between 0 and 18 dB. Obviously, this concept can be extended to other operational link SNR regions.

It was already mentioned before that fill frames are only inserted into the sequence of physical layer frames when there is no data available (e.g. at start up or due to a switch from one satellite to another in a make before break scenario) or when there is not enough data available. Indeed, fill frames are only sent when the actual symbol rate of the physical layer frames containing data is smaller than the given physical layer symbol rate and the fill frame symbol rate is smaller than or equal to the difference between said given physical layer symbol rate and the symbol rate of the data physical layer frames. Hence, in order not to cause an overflow in the modulator when multiplexing data physical layer frames and fill frames to obtain the sequence of physical layer frames, fill frames should only be sent when the data physical layer frames do not completely fill the physical carrier or virtual carrier symbol rate. The fill frame rate should be smaller than the difference between the physical carrier symbol rate or virtual carrier symbol rate and the data frames symbol rate. An alternative may be to have the fill frame rate fixed to a given value, for example 1 Mbaud and to reduce the maximum data physical layer frame rate by the same amount, so 1 Mbaud in this example. An embodiment wherein the fill frame rate is smaller than said difference is however preferred as it does not require a reduction of the maximum rate of the data physical layer frames. It can be implemented in a variety of ways.

Figure 6:
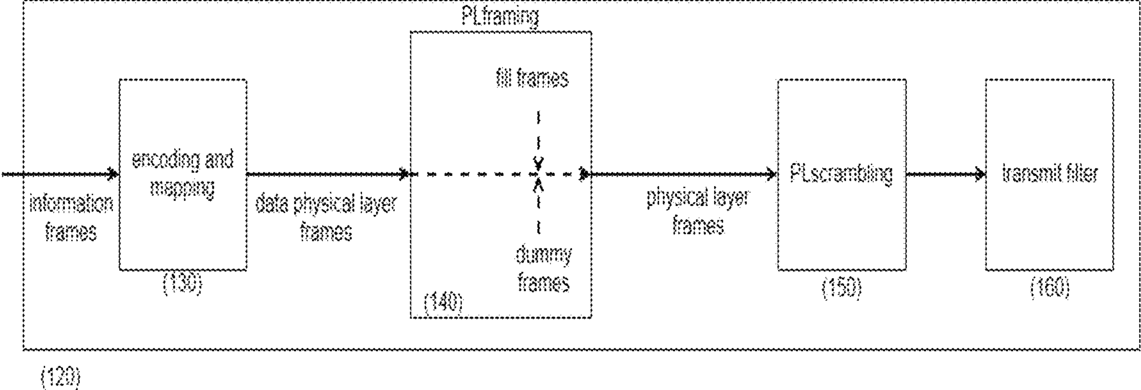
FIG. 6 illustrates an embodiment of the encoding and modulation means.

Whereas in some embodiments the physical layer frames only comprise data frames and one or more fill frames, there are other embodiments wherein apart from data frames and fill frames, also one or more dummy frames are inserted in the physical layer framing block. Inserting dummy frames in the physical layer framer, so after the encoder, is standardized in DVB-S2X. As already mentioned above, a dummy frame is inserted to guarantee a constant stream of I/Q symbols to the physical layer scrambler and transmit filter in case the encoder and mapper does not provide sufficient data frames to fill the carrier symbol rate, but dummy frames are not decoded at the receiver side. In the invention one or more dummy frames are replaced by fill frames as outlined above (e.g. one or more fill frames from a set of modcods. Nevertheless, dummy frames can still be applied. This results in a scheme as in FIG. 6, illustrating the insertion of both fill frames and dummy frames in the physical layer framer (140). An advantage of adding, possibly next to dummy frames, also fill frames is that the fill frames can use higher modcods which can result in better link quality monitoring. Indeed, as already mentioned, higher order modulations may correspond to a different output power from a non-linear amplifier than lower order modulations. Dummy frames only use QPSK modcods, so extending that with fill frames using a higher modulation order is useful.

Figure 7:
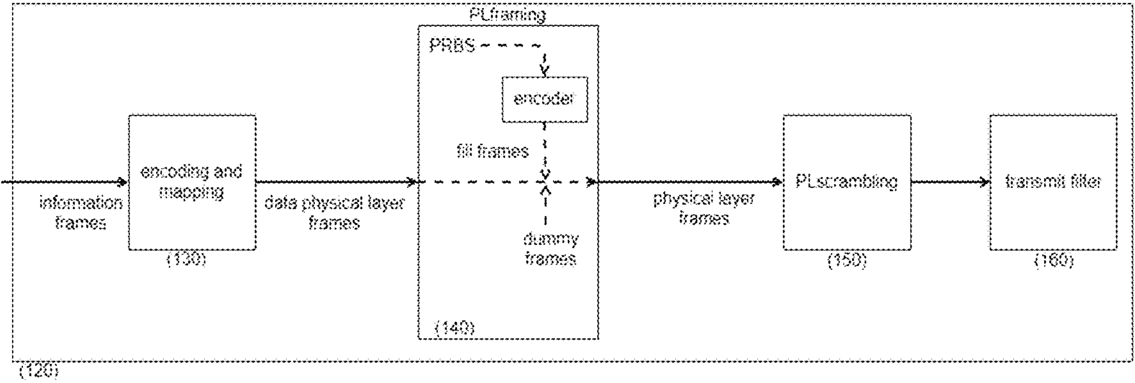
FIG. 7 illustrates an embodiment wherein the PL framer in the modulator adds fill frames comprising PRBS generated and encoded symbols.
Figure 8:
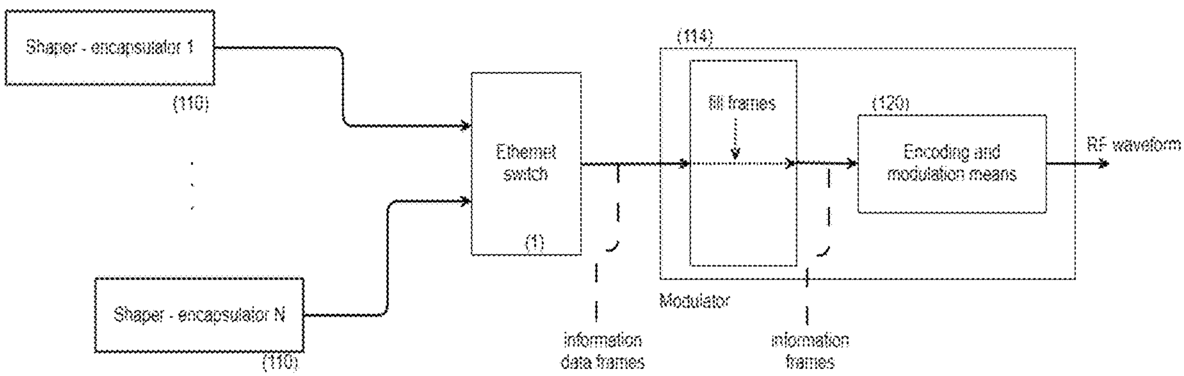
FIG. 8 illustrates an embodiment where fill frames are inserted before the encoder.

In order to have a stable and clean spectrum (e.g. according to FIG. A.1 in ETSI EN 302 307 V1.3.1) for the waveform comprising the fill frames, the fill frames must be random enough. E.g. a pseudo-random binary sequence (PRBS) generator can be used to generate a random mix of I/Q symbols from a particular constellation corresponding to the applicable modcod for a particular fill frame. Inserting the fill frames in the physical layer framer (140) is sufficient in case the link quality estimator(s) at the receiver side do not use decoder metrics. In that case the fill frames do not require decoding. However, in a preferred embodiment, decoder assisted link quality estimators are used to improve the accuracy of the link estimation and hence to contribute to a more accurate fast ACM process. This requires decoding the fill frames. This can be realized in multiple ways. One option is to insert an encoder between the PRBS generator generating the data for the fill frames and the insertion of physical layer frames (see FIG. 7). Obviously, as an alternative encoded fill frames can be read from a RAM for example, instead of encoding them on the fly. In yet another alternative, fill frames can be inserted before the encoder (120) as illustrated in FIG. 8, whereby the encoder then receives at its input information frames comprising both information data frames and fill frames. The latter solution is a preferred embodiment as it is compatible with the most accurate decoder assisted link estimators and it recuperates the entire existing modulator design, except for adding an insertion process to insert the fill frames. Conventionally, the transmit filter requires a new I/Q symbol at the symbol rate. To always have a symbol available, the physical layer scrambler (150) and physical layer framer (140) request a coded frame from the FEC encoder. If the FEC encoder does not have a frame, a dummy frame is inserted. The FEC encoder requests, typically indirectly (through other processing blocks in between the FEC encoder and the input of the modulator 120), information frames from the input of the modulator. Hence, the fill frame insertion can be implemented at the input of the modulator.

The fill frames are inserted in between the information data frames, e.g. when the encoding and modulation means (120) request an information frame and there are no information data frames available to be sent of a physical carrier or over an allowed virtual carrier within a physical carrier. Note that due to decoder throughput limitations, virtual carriers need to be "allowed" to be multiplexed on the physical carrier in order to avoid too high a throughput at the decoder side, as elaborately explained in WO2020/065043 A1, for example. As explained previously, also here fill frames may be inserted until a configurable fill frame throughput is achieved. The fill frames can for example be generated through a PRBS generator to realize a random bit stream, as already discussed above. Alternatively, the fill frames are read from a memory for example. In case of time slicing, such insertion of fill frames can occur per set of time slices, such set comprising one or more time slice numbers, such that each terminal part of a satnet and only listening to one virtual carrier will decode a sufficient number of fill frames.

Figure 9:
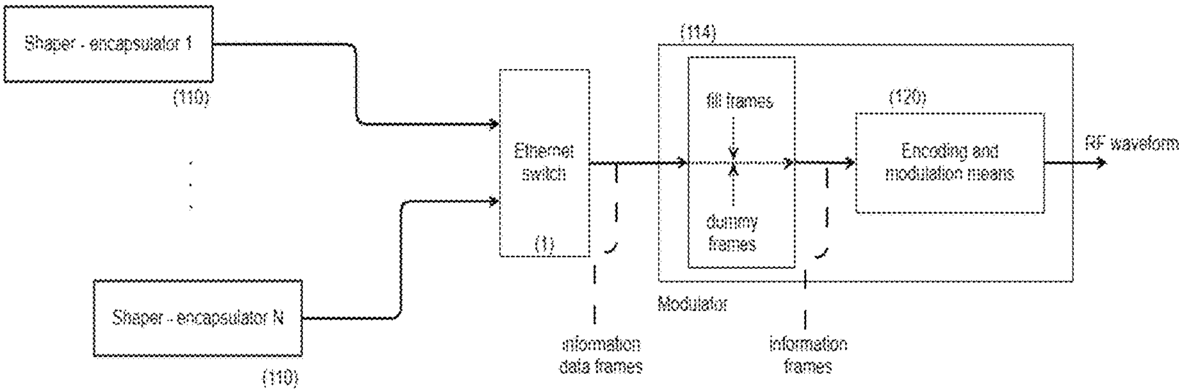
FIG. 9 illustrates an embodiment where fill frames and dummy frames are inserted before the encoder.

As also explained in WO2020/065043 A1, there can be a need to also insert, or orchestrate the insertion of, dummy frames at the input of the modulator (114), hence after the encapsulation processes, but before the encoding and modulation means (120). This may for example be the case because, at that location, also a time slice selector (202) is implemented that can decide when it is allowed sending an information frame tagged with a particular time slice number, or equivalently, when it is allowed sending an information frame in a particular virtual carrier. Fill frames are included per virtual carrier so that a particular terminal in a network, only decoding frames from a particular virtual carrier corresponding to that network, i.e. tagged by time slice numbers corresponding to that particular virtual carrier, can decode fill frames sent in this particular virtual carrier, to get well updated link quality estimations. In that case, both the insertion or the orchestration of the insertion of fill frames and dummy frames is performed at the input of the modulator (114), as shown in FIG. 9. In another embodiment, it just fills the entire physical carrier with fill frames as long as there are no data frames.

As explained before, the modulator input receives, typical in an indirect way (through some other processing blocks), a request from the FEC encoder to provide an information frame. In case there are no or not enough information data frames provided at the input of the modulator, then it can insert an information frame corresponding to a fill frame. In one embodiment, it can do that until the fill frames achieve a particular symbol rate. In another embodiment it just fills the entire physical carrier with fill frames as long as there are no data frames.

With orchestration of such insertion is meant that it can be indicated to the encoding and modulation means that one or more fill frames and/or dummy frames must be inserted in between two data physical layer frames, but that those fill frames and/or dummy frames are actually inserted only further in the chain. E.g. fill frames may be inserted just before the encoder and dummy frames may be inserted in the physical layer framer, after the encoder and before the scrambling.

In some embodiments the orchestration to insert fill frames comprises inserting fill information frames in the sequence of information frames using, per network, a PRBS generator. The fill information frames are subsequently encoded and mapped to fill frames.

The orchestration to insert fill frames may occur before the encapsulation processes, by inserting fill information packets with the lowest Quality of Service (QoS) class. Information packets receive a tag indicative of a QoS class they belong to. By assigning the lowest QoS class to the fill packets, all data information packets ready to transmit receive priority on fill information packets. So only when not sufficient data information packets are available to fill the assigned symbol rate, fill information packets will be passed to the encapsulator. The fill information packets received by the encapsulator are subsequently mapped to fill information frames by the encapsulator and mapped to fill frames by the encoder and mapper (130).

Figure 10:
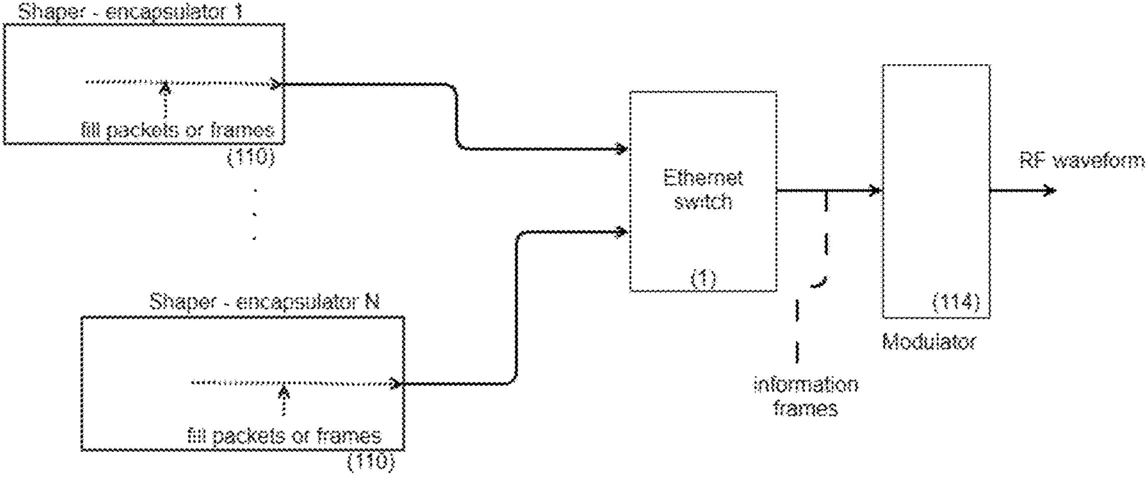
FIG. 10 illustrates an embodiment where fill frames are inserted even further upstream.

The insertion of fill packets, resulting in fill information frames, can even occur further upstream, before the encapsulation process, by inserting fill packets, or after the encapsulation process but still on the blade server by inserting fill frames, as illustrated in FIG. 10.

In order to avoid that the insertion of fill packets causes a reduction of achievable throughput, the fill packets should be assigned the lowest QoS class, which is suppressed in the presence of higher priority QoS classes to which actual user data belongs.

Sometimes, low cost receivers are sensitive to a burst of frame errors, and may go out of lock. Therefore, it may be desirable that the modcods of the fill frames alternate between a low and a high modcod. For example, first a fill frame is sent with a QPSK14 modcod, then 1 with a QPSK34 modcod, then again a QPSK14 modcod, followed by an 8PSK 56 modcod, then again a QPSK14 modcod, followed by a 16APSK34 modcod, then again a QPSK14 modcod, followed by a 32APSK56 modcod, etc As mentioned in the background, another problem encountered in the prior art is that sometimes (e.g. in low-cost terminals) the link quality monitoring is not accurate, e.g. in presence of channel artefacts such as non-linear distortion, phase noise or interference. This problem cannot always be mitigated by more advanced receiver processing due to the requirement for low-cost terminals (e.g. in consumer broadband networks, or for low power applications such as modem cards that are embedded in antennas, or for on-board processing, requiring chip based modems with limited complexity). As a consequence, large ACM margins are adopted to avoid errors on the data transmission due to imprecise link quality monitoring, with repercussions on the efficiency of transmission. Fill frames as described in this invention can be used to "calibrate" the link quality monitoring. More specifically, when using fill frames in the transmission, it can be observed which modcods result in frame errors and which do not at the receiver side, more precisely, for which modcods the probability to get erroneous frames after decoding is higher than quasi zero (e.g. higher than 1e−5) and for which modcods that chance is quasi zero or zero. This cannot be observed with actual data physical layer frames as they are transmitted with a modcod for which the likelihood is quasi zero or zero for a particular SNR. Data physical layer frames cannot be used to experiment and optimize the ACM margin as this would result in occasional frame errors after decoding and so reduce the quality of service of the user. However, fortunately, fill frames can be used in this end. More specifically, based on the estimated link quality, fill frames with modcods can be chosen with quasi error free (QEF) thresholds just below and above the estimated link quality to see which modcods are in error and which are not. This can then be used to calibrate and finetune the link quality monitoring as reported by the modem. To illustrate this by means of an example, consider the case of transmission over a particular non-linear channel where the monitored SNR is 1 dB too high on 64-APSK physical layer frames, because the SNR is measured on the preamble consisting of QPSK symbols which have 1 dB more power (due to their limited peak to average power ratio with respect to 64 APSK frames) than the payload symbols which are 64-APSK modulated. Due to this phenomenon, providers adopt ACM margins larger than 1 dB to avoid errored frames on 64-APSK frames. However, this monitored SNR is correct for a linear channel, in which case this ACM margin is 1 dB too large. Such an excessive margin can be detected by the proposed method. This can for example be used to avoid a user interface where the user must indicate whether the communication channel is linear or not. Such a user interface required effort from the user and is error prone, as the user may make a mistake or its input may become out of date.

In another embodiment, fill frames with modcods with QEF thresholds in steps of x dB can be transmitted in the case that an accuracy of x dB is targeted for the ACM margin. Either consecutively, either alternated with a low modcod (as outlined above, e.g. for receivers with sensitivity to a burst of frame errors). This avoids the need for selecting modcods for the fill frames, as one simply sends "sufficient" modcods anyway, via the fill frames. For example, to cover a range from 5 dB to 20 dB, only 15 modcods needs to be sent to target an accuracy of 1 dB.

Machine learning algorithms can be used to further learn an optimal ACM margin by observing the occurred frame errors and link quality monitoring using the invention.

Fill frames can also be used to improve other things than ACM margins or to perform other tasks than link quality monitoring. For instance, fill frames are inserted in the modulator in the physical carrier or per virtual carrier, preferably in the absence of traffic. Hence, based on the amount of fill frames inserted, information can be learned on the amount of congestion there is (i.e., how much the traffic is filling the available symbol rate in the physical or virtual carrier). This can be used for instance to adapt the symbol rate (e.g., to reduce the symbol rate if there is no congestion, or to increase the symbol rate if there is congestion) or to move terminals from a satnet that risks getting congested to another satnet that has less congestion (this is sometimes referred to as load balancing). Sometimes, depending on the mix of modcods, the achievable virtual carrier size reduces. If this is not notified to a shaper-encapsulator, there is a risk that the shaper-encapsulator send too much traffic to the modulator that gets queued there (resulting in buffer overflow, packet loss or too much jitter). By adding fill frames in the modulator, this can be avoided. More specifically, if the amount of fill frames added in a virtual carrier is decreasing over time, this could be an incentive to reduce the achievable virtual carrier size. Based on this, the shaper-encapsulator can be informed to send less symbols to the modulator in order to avoid a buffer overflow on the modulator. Hence, fill frames can also be used on the modulator side to improve the system performance. Alternatively, an increase over time of the amount of fill frames may be an indication that the achievable virtual carrier symbol rate has increased and thus the symbol rate shaped by the shaper-encapsulator for that virtual carrier can be increased.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A communication system comprising:

a transmitter and one or more receivers, said transmitter being arranged to transmit over a communication link a sequence of physical layer frames, each comprising symbols, at a given physical layer symbol rate to said one or more receivers, said sequence of physical layer frames being filtered with a transmit filter, adaptive coding and modulation optimization means arranged to determine per receiver of said one or more receivers a first modulation and coding for transmitting data to the receiver in question, wherein said transmitter is arranged to map said data for said one or more receivers in frames using an operational modulation and coding based on said first modulation and coding, thereby obtaining encoded and modulated data frames, and arranged to insert said encoded and modulated data frames into said sequence of physical layer frames, wherein said transmitter is further arranged to insert into said sequence, prior to said filtering with said transmit filter, at least one fill frame modulated with a first fill modulation or modulated and encoded with a first fill modulation and coding, said first fill modulation selected from a set of fill modulations comprising at least one fill modulation with a modulation order higher than Quadrature Phase Shift Keying (QPSK) or said first fill modulation and coding selected from a set of fill modulations and codings comprising at least one fill modulation and coding with a modulation order higher than QPSK, said communication system further comprising link quality detection means arranged to determine a metric of the quality of said communication link from a version of physical layer frames of said sequence received in one or more of said receivers, said physical layer frames comprising said at least one fill frame, and to convey said communication link quality metric to said adaptive coding and modulation optimization means so that said first modulation and coding can be updated based on said quality metric.

2. The communication system as in claim 1, wherein said transmitter is further arranged to insert at least one fill frame modulated with a second fill modulation from said set of fill modulations, said second fill modulation being different from said first fill modulation, or to insert at least one fill frame modulated and encoded with a second fill modulation and coding from said set of fill modulation and codings, said second fill modulation and coding being different from said first fill modulation and coding.

3. The communication system as in claim 1, wherein said at least one fill frame is inserted into said sequence when there is not enough data available, resulting in a fill rate of said at least one fill frame.

4. The communication system as in claim 3, wherein said fill rate is upper bounded by a configurable maximal fill rate.

5. The communication system as in claim 1, wherein an applied fill frame is selected from said set of fill modulations or said set of fill modulation and codings in a round-robin way.

6. The communication system as in claim 1, comprising encoding means to encode said fill frames before inserting into said sequence.

7. The communication system as in claim 1, wherein said metric of the quality of said communication link is determined based on previously received physical layer frames.

8. The communication system as in claim 1, wherein said set of fill modulation and codings comprises at least four fill modulation and codings.

9. The communication system as in claim 1, wherein said transmitter is further arranged for transmitting dummy frames.

10. The communication system as in claim 1, wherein said receivers are divided in subsets and to each subset is attributed a portion of said given physical layer symbol rate.

11. The communication system as in claim 10, wherein said transmitter is arranged to add said at least one fill frame on a per subset basis.

12. The communication system as in claim 1, wherein said operational modulation and coding is at most as spectrally efficient as said first modulation and coding.

13. The communication system as in claim 1, wherein said given physical layer symbol rate is assigned to said transmitter as a part of an overall physical layer symbol rate distributed over a plurality of transmitters.

14. The communication system as in claim 6, wherein said metric of the quality of said communication link is a link quality metric receiving information from a decoder.

15. The communication system as in claim 1, wherein said metric of the quality of said communication link is determined based on a subset of previously received physical layer frames, said subset being dependent on one or more predefined conditions.

16. The communication system as in claim 1, wherein said at least one fill frame is inserted before said data is mapped into said encoded and modulated data frames.

17. The communication system as in claim 16, wherein said at least one fill frame is inserted after encapsulation.

* * * * *